United States Patent
Wago et al.

(10) Patent No.: US 7,036,209 B1
(45) Date of Patent: May 2, 2006

(54) METHOD OF SIMULTANEOUSLY FORMING MAGNETIC TRANSITION PATTERNS OF A DUAL SIDE RECORDING MEDIUM

(75) Inventors: Koichi Wago, Sunnyvale, CA (US); Neil Deeman, Alamo, CA (US); Jing Gui, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 409 days.

(21) Appl. No.: 10/345,369

(22) Filed: Jan. 16, 2003

Related U.S. Application Data

(60) Provisional application No. 60/393,509, filed on Jul. 1, 2002.

(51) Int. Cl.
*G11B 5/127* (2006.01)
*G11B 5/80* (2006.01)
*H04R 31/00* (2006.01)

(52) U.S. Cl. ............... 29/603.2; 29/602.1; 29/603.01; 29/603.03; 29/603.05; 29/603.12; 360/135

(58) Field of Classification Search ............... 29/603.2, 29/602.1, 603.01, 603.03, 603.05, 603.12, 29/603.14; 360/135, 256.2, 264, 264.9; 369/275.1, 369/275.4
See application file for complete search history.

(56) References Cited

U.S. PATENT DOCUMENTS

| | | | |
|---|---|---|---|
| 3,318,056 A | | 5/1967 | Thompson |
| 3,753,252 A | * | 8/1973 | Tietze ..................... 360/135 |
| 4,114,334 A | | 9/1978 | Thoren |
| 4,719,171 A | * | 1/1988 | Ikenaga et al. ........ 430/270.11 |
| 4,843,787 A | | 7/1989 | Pierson |
| 4,935,835 A | * | 6/1990 | Godwin et al. ............. 360/135 |
| 5,092,520 A | | 3/1992 | Lestage |
| 5,155,924 A | | 10/1992 | Smith |
| 5,408,759 A | | 4/1995 | Bass |
| 5,555,643 A | | 9/1996 | Guasch |
| 5,893,216 A | | 4/1999 | Smith et al. |
| 5,933,411 A | * | 8/1999 | Inui et al. ................ 369/275.4 |

* cited by examiner

*Primary Examiner*—A. Dexter Tugbang
*Assistant Examiner*—Tai Nguyen
(74) *Attorney, Agent, or Firm*—McDermott Will & Emery LLP

(57) ABSTRACT

A method of simultaneously forming magnetic transition patterns in both side surfaces of a dual-sided magnetic or magneto-optical (MO) recording medium comprises steps of:

(a) providing a dual-sided magnetic or MO recording medium having first and second opposing side surfaces;

(b) providing a first magnetic stamper/imprinter having a first topographically patterned imprinting surface comprising a plurality of projections and depressions arranged in a first pattern corresponding to a first magnetic transition pattern to be formed in the first side surface;

(c) providing a second magnetic stamper/imprinter having a second topographically patterned imprinting surface comprising a plurality of projections and depressions arranged in a second pattern corresponding to a second magnetic transition pattern to be formed in the second side surface, the second magnetic stamper/imprinter being formed from the first magnetic stamper/imprinter in a "mother"/"son" relationship;

(d) contacting the first side surface with the first topographically patterned imprinting surface of the first magnetic stamper/imprinter;

(e) contacting the second side surface with the second topographically patterned imprinting surface of the second magnetic stamper/imprinter; and (f) simultaneously forming magnetic transition patterns in both side surfaces of the medium by contact printing.

20 Claims, 4 Drawing Sheets

METHOD OF SIMULTANEOUSLY FORMING MAGNETIC TRANSITION PATTERNS OF A DUAL SIDE RECORDING MEDIUM

CROSS-REFERENCE TO PROVISIONAL APPLICATION

This application claims priority from U.S. provisional patent application Ser. No. 60/393,509 filed Jul. 1, 2002, the entire disclosure of which is incorporated herein by reference.

FIELD OF THE INVENTION

The present invention relates to methods for forming magnetic transition patterns in dual-sided magnetic media by means of contact printing utilizing a pair of mirror-image magnetic stampers/imprinters. The invention has particular utility in the formation of servo patterns in the surfaces of magnetic recording layers of magnetic and magneto-optical (MO) data/information storage and retrieval media, e.g., hard disks.

BACKGROUND OF THE INVENTION

Magnetic and magneto-optical (MO) recording media are widely used in various applications, e.g., in hard disk form, particularly in the computer industry, for storage and retrieval of large amounts of data/information. Typically such media require pattern formation in the major surface(s) thereof for facilitating operation, e.g., servo pattern formation for enabling positioning of the read/write transducer head over a particular data band or region.

Magnetic and magneto-optical (MO) recording media are conventionally fabricated in thin film form; the former are generally classified as "longitudinal" or "perpendicular", depending upon the orientation (i.e., parallel or perpendicular) of the magnetic domains of the grains of the magnetic material constituting the active magnetic recording layer, relative to the surface of the layer.

In operation of magnetic media, the magnetic layer is locally magnetized by a write transducer or write head to record and store data/information. The write transducer creates a highly concentrated magnetic field which alternates direction based on the bits of information being stored. When the local magnetic field applied by the write transducer is greater than the coercivity of the recording medium layer, then the grains of the polycrystalline magnetic layer at that location are magnetized. The grains retain their magnetization after the magnetic field applied by the write transducer is removed. The direction of the magnetization matches the direction of the applied magnetic field. The pattern of magnetization of the recording medium can subsequently produce an electrical response in a read transducer, allowing the stored medium to be read.

A typical contact start/stop (CSS) method employed during use of disk-shaped recording media, such as the above-described thin-film magnetic recording media, involves a floating transducer head gliding at a predetermined distance from the surface of the disk due to dynamic pressure effects caused by air flow generated between mutually sliding surfaces of the transducer head and the disk. During reading and recording (writing) operations, the transducer head is maintained at a controlled distance from the recording surface, supported on a bearing of air as the disk rotates, such that the transducer head is freely movable in both the circumferential and radial directions, thereby allowing data to be recorded and retrieved from the disk at a desired position in a data zone.

Adverting to FIG. 1, shown therein, in simplified, schematic plan view, is a magnetic recording disk 30 (of either longitudinal or perpendicular type) having a data zone 34 including a plurality of servo tracks, and a contact start/stop (CSS) zone 32. A servo pattern 40 is formed within the data zone 34, and includes a number of data track zones 38 separated by servo tracking zones 36. The data storage function of disk 30 is confined to the data track zones 38, while servo tracking zones 36 provide information to the disk drive which allows a read/write head to maintain alignment on the individual, tightly-spaced data tracks.

Although only a relatively few of the servo tracking zones are shown in FIG. 1 for illustrative simplicity, it should be recognized that the track patterns of the media contemplated herein may include several hundreds of servo zones to improve head tracking during each rotation of the disk. In addition, the servo tracking zones need not be straight radial zones as shown in the figure, but may instead comprise arcs, intermittent zones, or irregularly-shaped zones separating individual data tracks.

In conventional hard disk drives, data is stored in terms of bits along the data tracks. In operation, the disk is rotated at a relatively high speed, and the magnetic head assembly is mounted on the end of a support or actuator arm, which radially positions the head on the disk surface. If the actuator arm is held stationary, the magnetic head assembly will pass over a circular path on the disk, i.e., over a data track, and information can be read from or written to that track. Each concentric track has a unique radius, and reading and writing information from or to a specific track requires the magnetic head to be located above that track. By moving the actuator arm, the magnetic head assembly is moved radially on the disk surface between tracks. Many actuator arms are rotatable, wherein the magnetic head assembly is moved between tracks by activating a servomotor which pivots the actuator arm about an axis of rotation. Alternatively, a linear actuator may be used to move a magnetic head assembly radially inwardly or outwardly along a straight line.

As has been stated above, to record information on the disk, the transducer creates and applies a highly concentrated magnetic field in close proximity to the magnetic recording medium. During writing, the strength of the concentrated magnetic field directly under the write transducer is greater than the coercivity of the recording medium, and grains of the recording medium at that location are magnetized in a direction which matches the direction of the applied magnetic field. The grains of the recording medium retain their magnetization after the magnetic field is removed. As the disk rotates, the direction of the writing magnetic field is alternated, based on bits of the information being stored, thereby recording a magnetic pattern on the track directly under the write transducer.

On each track, eight "bits" typically form one "byte" and bytes of data are grouped as sectors. Reading or writing a sector requires knowledge of the physical location of the data in the data zone so that the servo-controller of the disk drive can accurately position the read/write head in the correct location at the correct time. Most disk drives use disks with embedded "servo patterns" of magnetically readable information. The servo patterns are read by the magnetic head assembly to inform the disk drive of track location. In conventional disk drives, tracks typically include both data sectors and servo patterns and each servo pattern typically includes radial indexing information, as well as a "servo burst". A servo burst is a centering pattern to precisely position the head over the center of the track. Because of the locational precision needed, writing of servo patterns requires expensive servo-pattern writing equipment and is a time consuming process.

Commonly assigned, U.S. patent application Ser. No. 10/082,178, filed Feb. 26, 2002 now abandonment Aug. 23, 2005, the entire disclosure of which is incorporated herein by reference, discloses a method and apparatus for reliably, rapidly, and cost-effectively forming very sharply defined magnetic transition patterns in a magnetic medium containing a longitudinal or perpendicular type magnetic recording layer without requiring expensive, complicated servo writing equipment/techniques incurring long processing intervals.

Specifically, the invention disclosed in U.S. patent application Ser. No. 10/082,178 is based upon recognition that a stamper/imprinter comprised of a magnetic material having a high saturation magnetization, $B_{sat}$, i.e., $B_{sat} \geq$ about 0.5 Tesla, and a high permeability, $\mu$ i.e., $\mu \geq$ about 5, e.g., selected from Ni, NiFe, CoNiFe, CoSiFe, CoFe, and CoFeV, can be effectively utilized as a contact "stamper/imprinter" for contact "imprinting" of a magnetic transition pattern, e.g., a servo pattern, in the surface of a magnetic recording layer of a magnetic medium ("workpiece"), whether of longitudinal or perpendicular type. A key feature of this invention is the use of a stamper/imprinter having an imprinting surface including a topographical pattern, i.e., comprised of projections and depressions corresponding to a desired magnetic transition pattern, e.g., a servo pattern, to be formed in the magnetic recording layer. An advantage afforded by the invention is the ability to fabricate the topographically patterned imprinting surface of the stamper/imprinter, as well as the substrate or body therefor, of a single material, as by use of well-known and economical electro-forming techniques.

According to the invention, the magnetic domains of the magnetic recording layer of the workpiece are first unidirectionally aligned (i.e., "erased" or "initialized"), as by application of a first external, unidirectional magnetic field $H_{initial}$ of first direction and high strength greater than the saturation field of the magnetic recording layer, typically $\geq 2,000$ and up to about 20,000 Oe. The imprinting surface of the stamper/imprinter is then brought into intimate (i.e., touching) contact with the surface of the magnetic recording layer. With the assistance of a second externally applied magnetic field of second, opposite direction and lower but appropriate strength $H_{re-align}$, determined primarily by the coercivity of the media to be patterned and in part by $B_{sat}/\mu$ of the stamper material (typically $\geq 100$ Oe, e.g., from about 2,000 to about 4,500 Oe), the alignment of the magnetic domains at the areas of contact between the projections of the imprinting surface of the stamper/imprinter (in the case of perpendicular recording media, as schematically illustrated in FIG. 2) or at the areas facing the depressions of the imprinting surface of the stamper/imprinter (in the case of longitudinal recording media, as schematically illustrated in FIG. 3) and the magnetic recording layer of the workpiece is selectively reversed, while the alignment of the magnetic domains at the non-contacting areas (defined by the depressions in the imprinting surface of the stamper/imprinter) or at the contacting areas, respectively, is unaffected, whereby a sharply defined magnetic transition pattern is created within the magnetic recording layer of the workpiece to be patterned which essentially mimics the topographical pattern of projections and depressions of the imprinting surface. According to the invention, high $B_{sat}$ and high $\mu$ materials are preferred for use as the stamper/imprinter in order to: (1) avoid early magnetic saturation of the stamper/imprinter at the contact points between the projections of the imprinting surface and the magnetic recording layer, and (2) provide an easy path for the magnetic flux lines which enter and/or exit at the side edges of the projections.

Stampers/imprinters for use in a typical application, e.g., servo pattern formation in the recording layer of a disk-shaped, thin film, longitudinal or perpendicular magnetic recording medium comprise an imprinting surface having topographical features consisting of larger area data zones separated by smaller areas with well-defined patterns of projections and depressions corresponding to conventionally configured servo sectors, as for example, disclosed in U.S. Pat. Nos. 5,991,104 and 6,139,936, the entire disclosures of which are incorporated herein by reference. For example, a suitable topography for forming the servo sectors may comprise a plurality of projections (alt. depressions) having a height (alt. depth) in the range from about 100 to about 500 nm, a width in the range from about 50 to about 500 nm, and a spacing in the range from about 50 to about 500 nm.

According to conventional methodology, stampers/imprinters suitable for use in performing the foregoing patterning processes are manufactured by a sequence of steps as schematically illustrated in cross-sectional view in FIG. 4, which steps include providing a "master" comprised of a substantially rigid substrate with a patterned layer of a resist material thereon, the pattern comprising a plurality of projections and depressions corresponding (in positive or negative image form, as necessary) to the desired pattern to be formed in the surface of the stamper/imprinter. Stampers/imprinters are made from the master by initially forming a thin, conformal layer of an electrically conductive material (e.g., NiV) over the patterned resist layer and then electro-forming a substantially thicker ("blanket") magnetic layer (of the aforementioned magnetic metals and/or alloys) on the thin layer of electrically conductive material, which electro-formed blanket layer replicates the surface topography of the resist layer. Upon completion of the electro-forming process, the stamper/imprinter is separated from the master, which is then re-used for making additional stampers/imprinters.

Currently, contact printing for servo patterning of magnetic media is performed on one surface of a disk at-a-time, which practice disadvantageously imposes severe limitations on product throughput rates. Another disadvantage associated with the one surface at-a-time approach is the difficulty in performing contact printing of magnetic media such that the magnetic transition pattern formed on one media surface is a mirror image of the magnetic transition pattern formed on the other (opposite) surface. Formation of mirror image magnetic transition patterns on different media surfaces is considered desirable in order to minimize "WIRRO" (Written-In-Repeatable-Run-Out) problems in multi-head hard drive devices, such as head switching during drive operation, etc., arising from differences ("incoherency") in pattern registration between upper and lower disk surfaces.

A further impetus for developing improved methodology for performing dual-side contact printing of magnetic media is the requirement for obtaining increased product throughput rates necessary for economic competitiveness of servo-patterned disk manufacture.

Accordingly, there exists a need for means and methodology for performing dual-sided servo patterning by contact printing which are free of the above-described drawbacks and disadvantages associated with the use of conventional single-sided patterning, which means and methodology facilitate high quality, high throughput replication of servo patterns in dual-sided magnetic and MO recording media via contact printing.

The present invention addresses and solves the above-described problems, disadvantages, and drawbacks associated with prior methodologies for servo pattern formation in dual-sided thin film magnetic recording media, while maintaining full compatibility with the requirements of automated hard disk manufacturing technology.

DISCLOSURE OF THE INVENTION

An advantage of the present invention is an improved method of simultaneously forming magnetic transition patterns in both side surfaces of a dual-sided recording medium by means of contact printing.

Another advantage of the present invention is an improved method of simultaneously forming magnetic transition patterns in both side surfaces of a dual-sided magnetic or magneto-optical (MO) recording medium.

Yet another advantage of the present invention is an improved method of simultaneously forming servo patterns in both side surfaces of a disk-shaped dual-sided magnetic or magneto-optical (MO) recording medium.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of simultaneously forming magnetic transition patterns in both side surfaces of a dual-sided recording medium by means of contact printing, comprising steps of:

(a) providing a dual-sided recording medium having first and second opposing side surfaces;

(b) providing a first magnetic stamper/imprinter having a first topographically patterned imprinting surface comprising a plurality of projections and depressions arranged in a first pattern corresponding to a first magnetic transition pattern to be formed in the first side surface of the medium;

(c) providing a second magnetic stamper/imprinter having a second topographically patterned imprinting surface comprising a plurality of projections and depressions arranged in a second pattern corresponding to a second magnetic transition pattern to be formed in the second side surface of the medium, the second magnetic/stamper being formed from the first magnetic stamper/imprinter in a "mother"/"son" relationship;

(d) contacting the first side surface of the medium with the first topographically patterned imprinting surface of the first magnetic stamper/imprinter;

(e) contacting the second side surface of the medium with the second topographically patterned imprinting surface of the second magnetic stamper/imprinter; and (f) simultaneously forming magnetic transition patterns in both side surfaces of the medium by contact printing.

According to embodiments of the present invention, step (a) comprises providing a disk-shaped recording medium; and steps (b) and (c) each comprise providing a magnetic stamper/imprinter with a topographically patterned imprinting surface corresponding to a servo pattern to be formed in the respective side surface of the medium.

Preferred embodiments of the invention include those wherein step (a) comprises providing a disk-shaped magnetic or magneto-optical (MO) recording medium including at least one layer of a magnetic recording material on each of first and second opposing side surfaces of a substrate comprised of a non-magnetic material selected from the group consisting of Al, NiP-plated Al, Al—Mg alloys, other Al-based alloys, other non-magnetic metals, other non-magnetic metal based alloys, glass, ceramics, polymers, glass-ceramics, and composites or laminates of the aforementioned materials.

According to embodiments of the present invention, step (a) comprises unidirectionally aligning magnetic domains of the recording medium in a first direction, e.g., by unidirectionally aligning the magnetic domains by applying a first unidirectional DC magnetic field thereto; and step (f) comprises selectively re-aligning the direction of alignment of the magnetic domains of those portions of the first and second side surfaces of the recording medium which are in contact with the projections of the topographically patterned imprinting surfaces of the first and second stampers/imprinters or which face the depressions of the topographically patterned imprinting surfaces of the first and second stampers/imprinters, such that the magnetic domains of the contacted portions or the facing portions are aligned in a direction reverse that of the first direction, wherein the combination of aligned+re-aligned magnetic domains of each of the first and second side surfaces of the medium form respective first and second magnetic transition patterns replicating the first and second patterns of projections and depressions of the first and second topographically patterned imprinting surfaces of the first and second stampers/imprinters.

Embodiments of the present invention include those wherein step (f) comprises applying a second unidirectional DC magnetic field having a direction opposite that of the first unidirectional DC magnetic field, the second unidirectional DC magnetic field having sufficient strength to selectively reverse the unidirectional alignment of the magnetic domains provided by the first unidirectional DC magnetic field at those portions of the first and second side surfaces of said medium which are in contact with said projections of said topographically patterned imprinting surfaces of the first and second stampers/imprinters or which face the depressions of the topographically patterned imprinting surfaces of the stampers/imprinters, while retaining the unidirectional alignment of the magnetic domains provided by the first unidirectional DC magnetic field at those portions of the first and second side surfaces of the recording medium which face the depressions of the topographically patterned imprinting surfaces of the first and second stampers/imprinters or which are in contact with the projections of the topographically patterned imprinting surfaces of the stampers/imprinters.

According to particular embodiments of the present invention, step (a) comprises providing a dual-sided perpendicular magnetic recording medium and unidirectionally aligning the magnetic domains thereof in the first direction by applying a first unidirectional DC magnetic field thereto in a first direction perpendicular to the first and second side surfaces; and step (f) comprises selectively re-aligning the direction of alignment of the magnetic domains of those portions of the first and second side surfaces which are in contact with the projections of the topographically patterned imprinting surfaces of the first and second stampers/imprinters by applying the second unidirectional DC magnetic field in a second, opposite direction perpendicular to the first and second side surfaces.

In accordance with further particular embodiments of the present invention, step (a) comprises providing a dual-sided longitudinal magnetic recording medium and unidirectionally aligning the magnetic domains thereof in the first direction by applying a first unidirectional DC magnetic field thereto in a first direction parallel to the first and second side surfaces; and step (f) comprises selectively re-aligning the direction of alignment of the magnetic domains of those portions of the first and second side surfaces which face the depressions of the topographically patterned imprinting surfaces of the first and second stampers/imprinters by applying the second unidirectional DC magnetic field in a second, opposite direction parallel to the first and second side surfaces.

According to embodiments of the present invention, the method further comprises:

(g) removing the first and second stampers/imprinters from contact with respective first and second side surfaces of the recording medium.

According to preferred embodiments of the present invention, step (b) comprises providing the first magnetic stamper/imprinter as a "mother" stamper/imprinter formed from a "father" stamper/imprinter; and step (c) comprises providing the second magnetic stamper/imprinter as a "son" stamper/imprinter formed from the "mother" stamper imprinter, wherein step (b) comprises forming the "father" stamper/imprinter from a "master" stamper/imprinter and further comprises forming the "father" stamper/imprinter to comprise a topographically patterned surface in the form of a mirror image of a topographically patterned surface of the "master" and forming the "mother" stamper/imprinter to comprise a topographically patterned surface in the form of a mirror image of the topographically patterned surface of the "father" stamper/imprinter; and step (c) comprises forming the "son" stamper/imprinter to comprise a topographically patterned surface in the form of a mirror image of the topographically patterned surface of the "mother" stamper/imprinter.

In accordance with preferred embodiments of the present invention, step (b) comprises forming the "father" stamper/imprinter utilizing a "master" stamper/imprinter comprising a topographically patterned resist layer formed on a surface of a substrate, the topographically patterned resist layer comprising a patterned plurality of spaced-apart recesses with a plurality of non-recessed areas therebetween, the topographical pattern corresponding to a magnetic pattern to be formed in at least one surface of the medium; wherein step (b) comprises forming the "father" stamper/imprinter from the "master" stamper/imprinter by means of a process including sequential steps of forming a blanket layer of a magnetic material overfilling each of the plurality of recesses of the resist layer and including an overburden portion extending over each of the non-recessed areas; and separating the blanket layer from the resist layer; step (b) further comprising forming the "mother" stamper/imprinter from the "father" stamper/imprinter by means of a process including sequential steps of forming a blanket layer of a magnetic material overfilling each of a plurality of recesses of a topographically patterned imprinting surface of the "father" stamper/imprinter and including an overburden portion extending over each non-recessed area therebetween; and separating the blanket layer from the topographically patterned imprinting surface of the "father" stamper/imprinter.

According to further preferred embodiments of the present invention, step (c) comprises forming the second magnetic stamper/imprinter as a "son" stamper/imprinter of the "mother" stamper/imprinter by means of a process including sequential steps of forming a blanket layer of a magnetic material overfilling each of a plurality of recesses of the topographically patterned imprinting surface of the "mother" stamper/imprinter and including an overburden portion extending over each non-recessed area therebetween; and separating the blanket layer from the topographically patterned imprinting surface of the "mother" stamper/imprinter.

Preferred embodiments of the invention include those wherein each of the steps of forming a blanket layer of a magnetic material comprises electro-forming; and wherein steps (b) and (c) each comprise providing a magnetic stamper/imprinter wherein the imprinting surface is comprised of at least one magnetic material having high saturation magnetization $B_{sat} \geq \sim 0.5$ Tesla and high permeability $\mu \geq \sim 5$, selected from the group consisting of Ni, NiFe, CoNiFe, CoSiFe, CoFe, and CoFeV.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, wherein.

DESCRIPTION OF THE INVENTION

The present invention addresses and solves problems attendant upon the use of magnetic stampers/imprinters for performing contact patterning of both sides of dual-sided magnetic and magneto-optical (MO) recording media, e.g., servo patterning. Specifically, the present invention addresses "WIRRO" (Written-In-Repeatable-Run-Out) problems in multi-head hard drive devices, such as head switching during drive operation, etc., arising from differences ("incoherency") in pattern registration between upper and lower disk surfaces. In addition, the present invention has as an aim the elimination of the requirement for one surface at-a-time contact patterning according to the conventional art and the development of methodology for simultaneously contact patterning both sides of dual-sided media.

Briefly stated, the present invention is based upon the discovery by the inventors that improved methodology (and means) for performing simultaneous contact printing of magnetic patterns in both surfaces of a dual-sided magnetic or MO recording medium can be obtained by making and utilizing a single recorded "master" for patterning both sides of a dual-sided recording medium by means of contact printing. According to the invention, the single "master" is utilized for forming a "father" stamper/imprinter which in turn is utilized for forming "mother" and "son" stampers/imprinters in mirror-image relationship, which "mother" and "son" stampers/imprinters are utilized as first and second magnetic stampers/imprinters for contact patterning of oppositely facing major surfaces of a recording medium, e.g., a disk-shaped magnetic or MO medium, wherein the topographically patterned imprinting surfaces of the stampers/imprinters are in mirror image relation. According to key features or characteristics of the inventive methodology, expense required for forming two "masters" is eliminated and distortion of the topographical patterns of the imprinting surfaces of the stampers/imprinters, e.g., arising from, e.g., plating, electro-forming, etc., of a "father" stamper/imprinter utilizing a "master" stamper/imprinter, is effectively obviated by the use of substantially identically patterned, mirror image "mother" and "son" stampers/imprinters each ultimately derived from the same "father" stamper/imprinter, thereby resulting in identical, i.e., coherent "WIRRO" from the upper disk surface to the lower disk surface and improved head switching during drive operation, etc.

Figure 4:
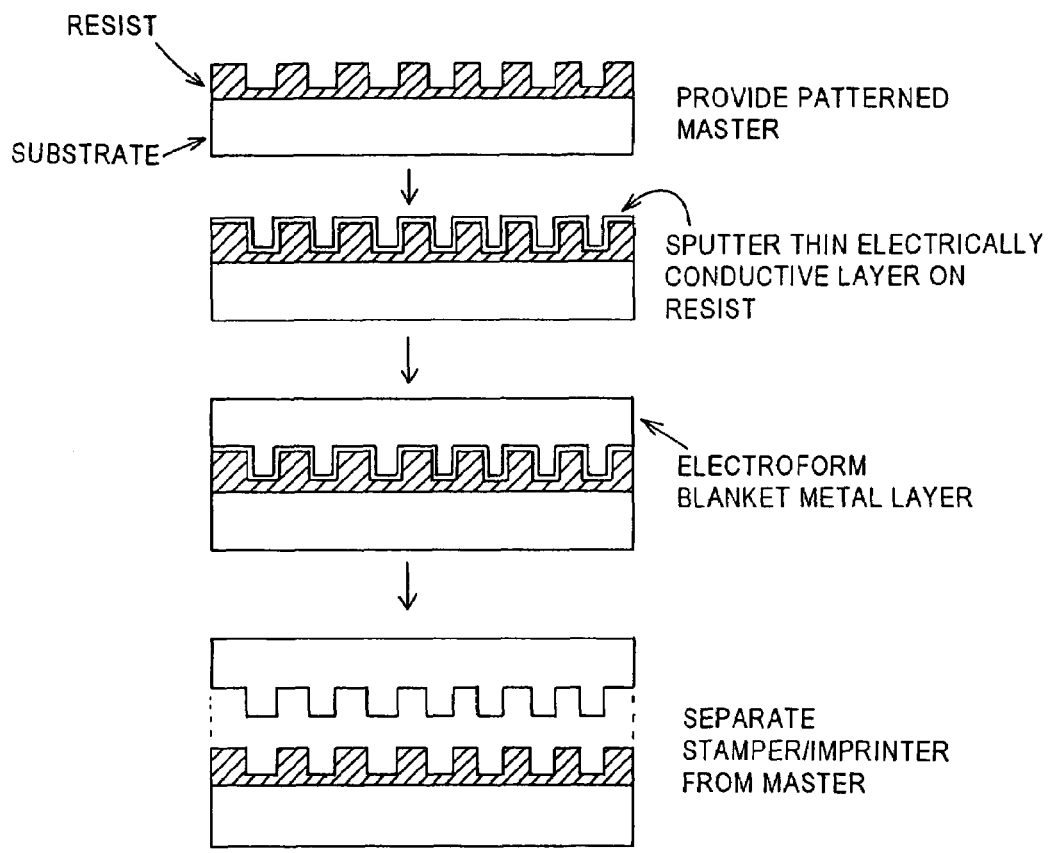
FIG. 4 schematically illustrates, in simplified cross-sectional view, a sequence of steps for forming a magnetic stamper/imprinter for recording media patterning, according to the conventional art.
Figure 5:
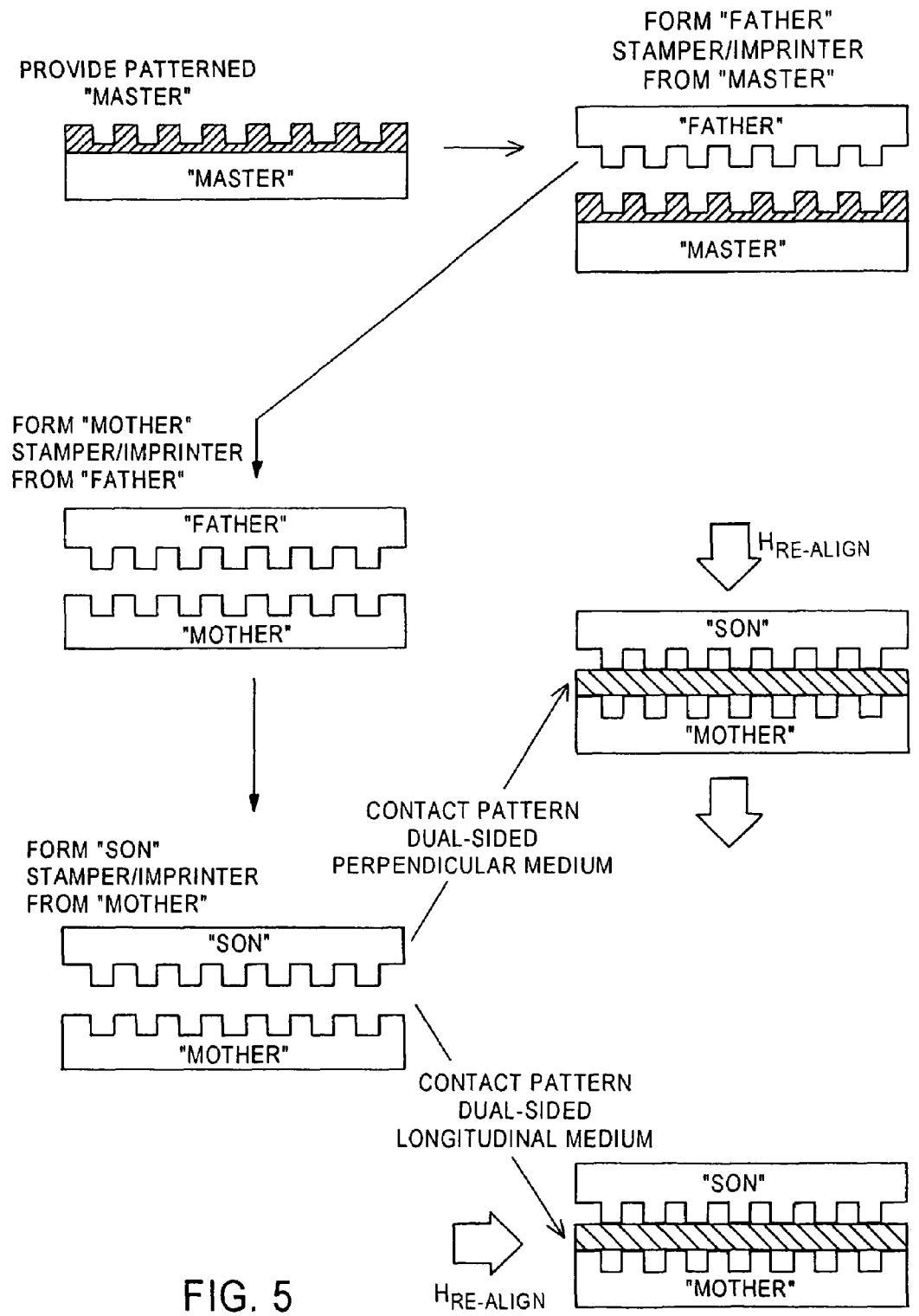
FIG. 5 is a schematic flow chart of the method according to an embodiment of the present invention.

Referring now to FIG. 5, schematically illustrated therein, in cross-sectional view, is a simplified flow chart of the method according to an embodiment of the present invention, in which each step for forming a magnetic stamper/imprinter from a "master", "father" or "mother" stamper/imprinter is generally similar to the sequence of steps illustrated in FIG. 4, described supra. Thus, according to the invention, a "master" comprised of a substantially rigid substrate with a topographically patterned layer of a resist material thereon is initially provided, the pattern having been formed in the resist layer by conventional resist exposure/development techniques, and comprised of a plurality of projections and depressions corresponding (in positive or negative image form, as necessary) to the desired pattern to be formed in the surface of the succeeding stampers/imprinters derived therefrom, e.g., a servo pattern including a plurality of projections (alt. depressions) having a height (alt. depth) in the range from about 100 to about 500 nm, a width in the range from about 50 to about 500 nm, and a spacing in the range from about 50 to about 500 nm.

In the next step according to an embodiment of the invention, a thin layer of an electrically conductive material, e.g., NiV, is formed on the topographically patterned surface of the "master", by means of a suitable thin film deposition process, for example, selected from the group consisting of electroless plating, physical vapor deposition (PVD) such as sputtering, and chemical vapor deposition (CVD). According to this embodiment, the thin layer of electrically conductive material is formed only to a thickness sufficient to facilitate its use as an electrode (e.g., from about 100 to about 200 nm thick) in a next-performed electrochemical deposition process, e.g., an electro-forming process, for forming a relatively thicker blanket layer (e.g., from about 200 to about μm thick) of a high $B_{sat} \geq \sim 1.2$ and high permeability $\mu \geq \sim 5$ material, e.g., selected from the group consisting of NiFe, CoNiFe, CoSiFe, Cofe, CoFeB, and CoFeV, overfilling each of the plurality of recesses and including an overburden portion extending over each of the non-recessed areas, the blanket layer having an exposed surface opposite the topographically patterned surface of the master.

According to another embodiment of the invention, deposition of the layer of high $B_{sat}$, high permeability μ material, as by electroless plating, PVD, or CVD, is continued for an interval sufficient to form a relatively thick blanket layer (e.g., from about 200 to about 500 μm thick) of the high $B_{sat}$, high permeability μ material overfilling each of the plurality of recesses and including an overburden portion extending over each of the non-recessed areas, the blanket layer having an exposed surface opposite the topographically patterned surface of the master.

In either instance, the thus-formed blanket layer of high $B_{sat}$, high μ magnetic material is then separated from the topographically patterned surface of the "master" to form a "father" stamper/imprinter. According to the invention, the thus-formed "father" magnetic stamper/imprinter is then utilized, in entirely analogous fashion to that of the "master", for forming a "mother" magnetic stamper/imprinter therefrom, which "mother" magnetic stamper/imprinter is then utilized, in entirely similar fashion, for forming a "son" magnetic stamper/imprinter therefrom.

Figure 1:
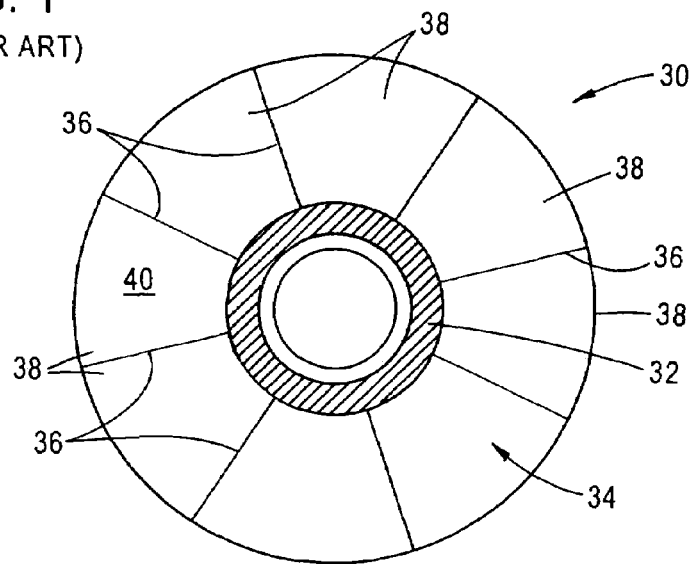
FIG. 1 illustrates in simplified, schematic plan view, a magnetic recording disk designating the data, servo pattern, and CSS zones thereof.
Figure 2:
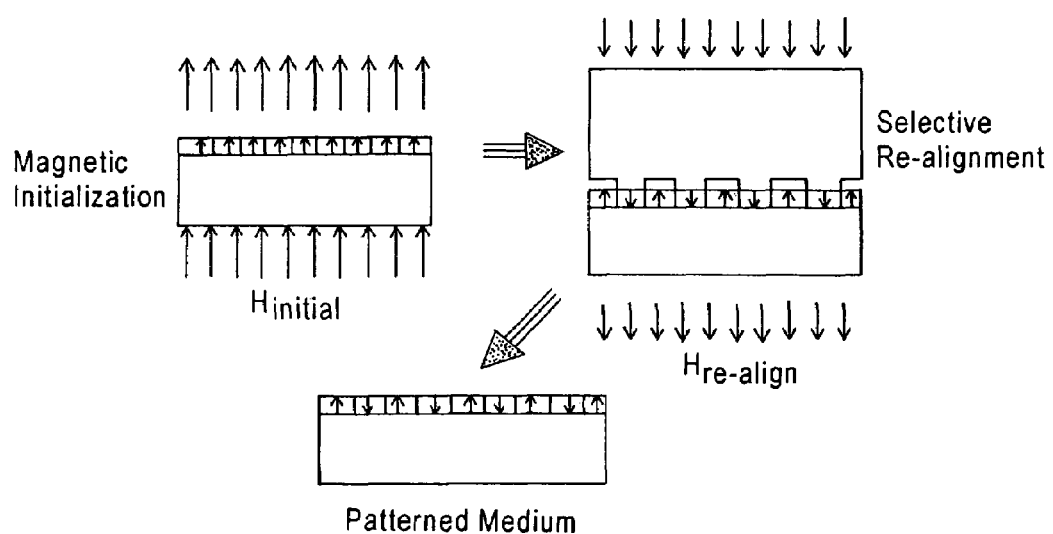
FIG. 2 illustrates, in schematic, simplified cross-sectional view, a sequence of process steps for contact printing a magnetic transition pattern in the surface of a perpendicular magnetic recording layer, utilizing a stamper/imprinter formed of a high saturation magnetization ($B_{sat}$), high permeability ($\mu$) magnetic material having an imprinting surface with a surface topography corresponding to the desired magnetic transition pattern.
Figure 3:
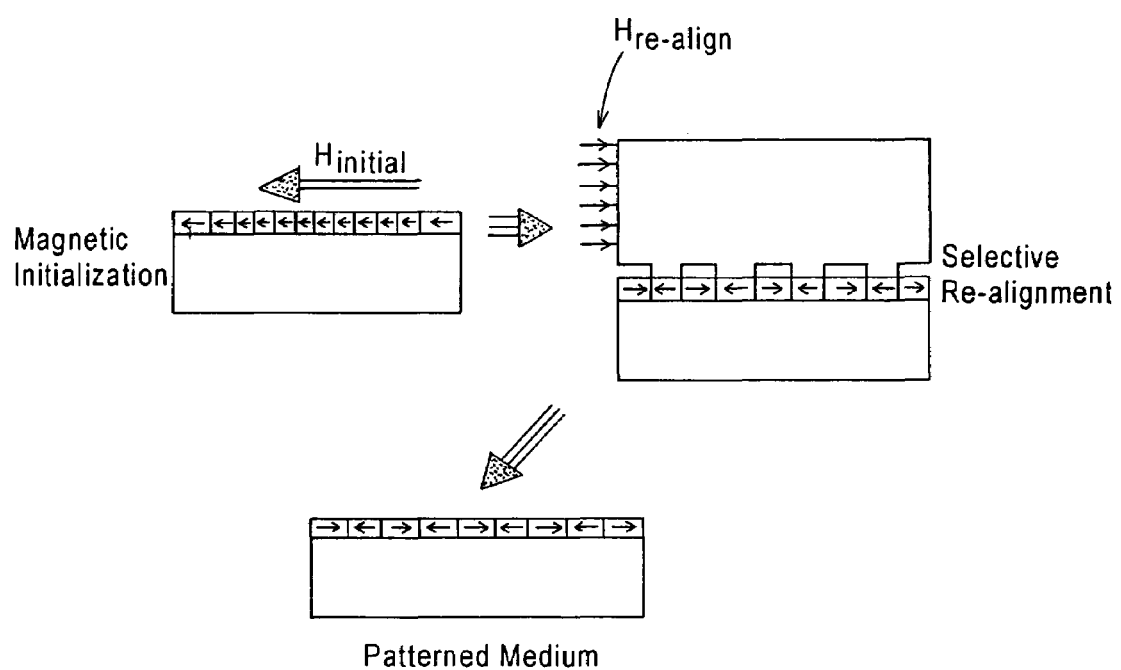
FIG. 3 illustrates, in schematic, simplified cross-sectional view, a similar sequence of process steps for contact printing a magnetic transition pattern in the surface of a longitudinal magnetic recording layer.

In the final step according to the invention, the thus-formed, mirror-image relationship "mother" and "son" magnetic stampers/imprinters are utilized for simultaneous contact printing of both sides of a magnetically initialized, i.e., unidirectionally aligned, dual-sided magnetic or MO recording medium, e.g., a disk-shaped medium including at least one layer of a magnetic recording material on each of first and second opposing side surfaces of a substrate comprised of a non-magnetic material selected from the group consisting of Al, NiP-plated Al, Al—Mg alloys, other Al-based alloys, other non-magnetic metals, other non-magnetic metal based alloys, glass, ceramics, polymers, glass-ceramics, and composites or laminates of the aforementioned materials. As shown in FIG. 5, the "mother" stamper/imprinter is placed in contact with a first surface of a magnetically initialized dual-sided medium, and the "son" stamper/imprinter is placed in contact with a second, opposing surface of the medium. Similar to the situations illustrated in FIGS. 2–3, the magnetic re-alignment field $H_{re-align}$ for effecting selective magnetization reversal resulting in pattern formation in the magnetic layer(s) of the medium, is applied perpendicularly to the major surfaces of the medium in the case of perpendicular magnetic recording media and parallel to the major surfaces of the medium in the case of longitudinal magnetic recording media.

Thus, according to embodiments of the invention, a dual-sided perpendicular magnetic recording medium is provided, with the magnetic domains thereof unidirectionally aligned in a first direction, as by application of a first unidirectional DC magnetic field thereto in a first direction perpendicular to the first and second major surfaces thereof; and the direction of alignment of the magnetic domains of those portions of the first and second side surfaces which are in contact with the projections of the topographically patterned imprinting surfaces of the "mother" and "son" stampers/imprinters are selectively re-aligned (i.e., reversed) by applying the second unidirectional DC magnetic re-alignment field $H_{re-align}$ in a second, opposite direction perpendicular to the first and second side surfaces.

According to other embodiments of the present invention, a dual-sided longitudinal magnetic recording medium is provided, with the magnetic domains thereof unidirectionally aligned in a first direction, as by application of a first unidirectional DC magnetic field thereto in a first direction parallel to the first and second major surfaces thereof; and the direction of alignment of the magnetic domains of those portions of the first and second side surfaces which face the depressions of the topographically patterned imprinting surfaces of the "mother" and "son" stampers/imprinters are selectively re-aligned (i.e., reversed) by applying the second unidirectional DC magnetic re-alignment field $H_{re-align}$ in a second, opposite direction parallel to the first and second side surfaces.

The present invention thus affords a number of advantages and improvements in magnetic stampers/imprinters for contact printing of magnetic recording media, including servo patterning, which improvements include, inter alia, patterning with high field contrast attributable to use of high $B_{sat}$, high μ materials for the imprinting surface, while retaining the exemplary durability and mechanical characteristics of Ni, as well as improved corrosion protection of the Fe-containing imprinting surface. In addition, the improved magnetic stampers/imprinters according to the invention are readily manufactured by conventional methodologies.

It should be apparent to one of ordinary skill in the art that the present invention, by virtue of the use of substantially identically structured, mirror-image "mother" and "son" magnetic stampers/imprinters for performing simultaneous contact patterning of dual-sided media with improved pattern registration between media surfaces, provides a significant improvement over the conventional art such as has been described above, particularly with respect to the ease and simplicity of performing simultaneous servo patterning of both surfaces of a variety of dual-sided magnetic and MO recording media. Further, the imprinting surface of the stampers/imprinters according to the invention can be formed with a wide variety of topographical patterns, whereby the inventive methodology can be rapidly, easily, and cost-effectively implemented in the automated manufacture of a number of magnetic articles, devices, etc., requiring patterning, of which servo patterning of longitudinal and perpendicular magnetic recording media merely constitute examples of the versatility and utility of the invention.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A method of simultaneously forming magnetic transition patterns in both side surfaces of a dual-sided recording medium by means of contact printing, comprising steps of:
   (a) providing a dual-sided recording medium having first and second opposing side surfaces;
   (b) providing a first magnetic stamper/imprinter having a first topographically patterned imprinting surface comprising a plurality of projections and depressions arranged in a first pattern corresponding to a first magnetic transition pattern to be formed in said first side surface of said medium;
   (c) providing a second magnetic stamper/imprinter having a second topographically patterned imprinting surface comprising a plurality of projections and depressions arranged in a second pattern corresponding to a second magnetic transition pattern to be formed in said second side surface of said medium, said second magnetic/ stamper being formed from said first magnetic stamper/ imprinter in a "mother"/"son" relationship;
   (d) contacting said first side surface of said medium with said first topographically patterned imprinting surface of said first magnetic stamper/imprinter;
   (e) contacting said second side surface of said medium with said second topographically patterned imprinting surface of said second magnetic stamper/imprinter; and
   (f) simultaneously forming magnetic transition patterns in both side surfaces of said medium by contact printing.

2. The method as in claim 1, wherein:
step (a) comprises providing a disk-shaped recording medium; and
steps (b) and (c) each comprise providing a magnetic stamper/imprinter with a topographically patterned imprinting surface corresponding to a servo pattern to be formed in the respective side surface of said medium.

3. The method as in claim 2, wherein:
step (a) comprises providing a disk-shaped magnetic or magneto-optical (MO) recording medium including at least one layer of a magnetic recording material on each of first and second opposing side surfaces of a substrate comprised of a non-magnetic material selected from the group consisting of Al, NiP-plated Al, Al—Mg alloys, other Al-based alloys, other non-magnetic metals, other non-magnetic metal based alloys, glass, ceramics, polymers, glass-ceramics, and composites or laminates of the aforementioned materials.

4. The method as in claim 1, wherein:
step (a) comprises unidirectionally aligning magnetic domains of said recording medium in a first direction.

5. The method as in claim 4, wherein:
step (a) comprises unidirectionally aligning said magnetic domains by applying a first unidirectional DC magnetic field thereto.

6. The method as in claim 5, wherein:
step (f) comprises selectively re-aligning the direction of alignment of the magnetic domains of those portions of said first and second side surfaces of said recording medium which are in contact with said projections of said topographically patterned imprinting surfaces of said first and second stampers/imprinters or which face said depressions of said topographically patterned imprinting surfaces of said first and second stampers/ imprinters, such that said magnetic domains of said contacted portions or said facing portions are aligned in a direction reverse that of said first direction, wherein the combination of aligned and re-aligned magnetic domains of each of the first and second side surfaces of said medium form respective first and second magnetic transition patterns replicating said first and second patterns of projections and depressions of said first and second topographically patterned imprinting surfaces of said first and second stampers/imprinters.

7. The method as in claim 6, wherein:

step (f) comprises applying a second unidirectional DC magnetic field having a direction opposite that of said first unidirectional DC magnetic field, said second unidirectional DC magnetic field having sufficient strength to selectively reverse the unidirectional alignment of said magnetic domains provided by said first unidirectional DC magnetic field at those portions of said first and second side surfaces of said recording medium which are in contact with said projections of said topographically patterned imprinting surfaces of said first and second stampers/imprinters or which face said depressions of said topographically patterned imprinting surfaces of said stampers/imprinters, while retaining the unidirectional alignment of said magnetic domains provided by said first unidirectional DC magnetic field at those portions of said first and second side surfaces of said recording medium which face said depressions of said topographically patterned imprinting surfaces of said first and second stampers/imprinters or which are in contact with said projections of said topographically patterned imprinting surfaces of said stampers/imprinters.

8. The method as in claim 7, wherein:

step (a) comprises providing a dual-sided perpendicular magnetic recording medium and unidirectionally aligning said magnetic domains thereof in said first direction by applying a first unidirectional DC magnetic field thereto in a first direction perpendicular to said first and second side surfaces; and step (f) comprises selectively re-aligning the direction of alignment of the magnetic domains of those portions of said first and second side surfaces which are in contact with said projections of said topographically patterned imprinting surfaces of said first and second stampers/imprinters by applying said second unidirectional DC magnetic field in a second, opposite direction perpendicular to said first and second side surfaces.

9. The method as in claim 7, wherein:

step (a) comprises providing a dual-sided longitudinal magnetic recording medium and unidirectionally aligning said magnetic domains thereof in said first direction by applying a first unidirectional DC magnetic field thereto in a first direction parallel to said first and second side surfaces; and step (f) comprises selectively re-aligning the direction of alignment of the magnetic domains of those portions of said first and second side surfaces which face said depressions of said topographically patterned imprinting surfaces of said first and second stampers/imprinters by applying said second unidirectional DC magnetic field in a second, opposite direction parallel to said first and second side surfaces.

10. The method as in claim 1, further comprising:

(g) removing said first and second stampers/imprinters from contact with respective said first and second side surfaces of said recording medium.

11. The method as in claim 1, wherein:

step (b) comprises providing said first magnetic stamper/imprinter as a "mother" stamper/imprinter formed from a "father" stamper/imprinter; and step (c) comprises providing said second magnetic stamper/imprinter as a "son" stamper/imprinter formed from said "mother" stamper imprinter.

12. The method as in claim 11, wherein:

step (b) comprises forming said "father" stamper/imprinter from a "master" stamper/imprinter.

13. The method as in claim 12, wherein:

step (b) comprises forming said "father" stamper/imprinter to comprise a topographically patterned surface in the form of a mirror image of a topographically patterned surface of said "master" and forming said "mother" stamper/imprinter to comprise a topographically patterned surface in the form of a mirror image of said topographically patterned surface of said "father" stamper/imprinter; and step (c) comprises forming said "son" stamper/imprinter to comprise a topographically patterned surface in the form of a mirror image of said topographically patterned surface of said "mother" stamper/imprinter.

14. The method as in claim 13, wherein:

step (b) comprises forming said "father" stamper/imprinter utilizing a "master" stamper/imprinter comprising a topographically patterned resist layer formed on a surface of a substrate, said topographically patterned resist layer comprising a patterned plurality of spaced-apart recesses with a plurality of non-recessed areas therebetween, said topographical pattern corresponding to a magnetic pattern to be formed in a surface of said medium.

15. The method as in claim 14, wherein:

step (b) comprises forming said "father" stamper/imprinter from said "master" stamper/imprinter by means of a process including sequential steps of forming a blanket layer of a magnetic material overfilling each of said plurality of recesses of said resist layer and including an overburden portion extending over each of said non-recessed areas; and separating said blanket layer from said resist layer.

16. The method as in claim 15, wherein:

step (b) further comprises forming said "mother" stamper/imprinter from said "father" stamper/imprinter by means of a process including sequential steps of forming a blanket layer of a magnetic material overfilling each of a plurality of recesses of a topographically patterned imprinting surface of said "father" stamper/imprinter and including an overburden portion extending over each non-recessed area therebetween; and separating said blanket layer from the topographically patterned imprinting surface of said "father" stamper/imprinter.

17. The method as in claim 16, wherein:

step (c) comprises forming said second magnetic stamper/imprinter as a "son" stamper/imprinter of said "mother" stamper/imprinter by means of a process including sequential steps of forming a blanket layer of a magnetic material overfilling each of a plurality of recesses of said topographically patterned imprinting surface of said "mother" stamper/imprinter and including an overburden portion extending over each non-recessed area therebetween; and separating said blanket layer from the topographically patterned imprinting surface of said "mother" stamper/imprinter.

18. The method as in claim 17, wherein:

each of said steps of forming a blanket layer of a magnetic material comprises electro-forming.

19. The method as in claim 11, wherein:

steps (b) and (c) each comprise providing a magnetic stamper/imprinter wherein said imprinting surface is comprised of at least one magnetic material having high saturation magnetization $B_{sat} \geq \sim 0.5$ Tesla and high permeability $\mu \geq \sim 5$.

20. The method as in claim 19, wherein:

steps (b) and (c) each comprise providing a magnetic stamper/imprinter wherein said imprinting surface is comprised of a least one magnetic material selected from the group consisting of Ni, NiFe, CoNiFe, CoSiFe, CoFe, and CoFeV.

* * * * *